United States Patent
Park et al.

(10) Patent No.: US 7,599,035 B2
(45) Date of Patent: Oct. 6, 2009

(54) LIQUID CRYSTAL DISPLAY DEVICE AND METHOD OF DRIVING THE SAME

(75) Inventors: Joon-Kyu Park, Gyeonggi-do (KR); Hyun-Suk Jin, Gyeonggi-do (KR); Hyung-Seok Jang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 342 days.

(21) Appl. No.: 11/639,272

(22) Filed: Dec. 15, 2006

(65) Prior Publication Data

US 2007/0153197 A1 Jul. 5, 2007

(30) Foreign Application Priority Data

Dec. 29, 2005 (KR) .................. 10-2005-0132797

(51) Int. Cl.
*G02F 1/1343* (2006.01)
*G02F 1/1337* (2006.01)

(52) U.S. Cl. .................. 349/141; 349/129; 349/130; 349/139

(58) Field of Classification Search ......... 349/129–130, 349/141, 139
See application file for complete search history.

(56) References Cited

U.S. PATENT DOCUMENTS 6,714,206 B1 * 3/2004 Martin et al. ................ 345/589
6,836,300 B2 * 12/2004 Choo et al. ................... 349/43
7,489,326 B2 * 2/2009 Park .......................... 345/696

\* cited by examiner

*Primary Examiner*—Dung T. Nguyen
(74) *Attorney, Agent, or Firm*—Holland & Knight LLP

(57) ABSTRACT

A liquid crystal display device includes first and second substrates facing and spaced apart from each other, each of the first and second substrates having a first sub-pixel region, a second sub-pixel region, a third sub-pixel region, a fourth sub-pixel region and a fifth sub-pixel region for adjusting a viewing angle, the first, second, third and fourth sub-pixel regions surrounding the fifth sub-pixel region; a liquid crystal layer between the first and second substrates; a plurality of first pixel electrodes in each of the first, second, third and fourth sub-pixel regions on the first substrate; a plurality of first common electrodes in each of the first, second, third and fourth sub-pixel regions on the first substrate, the plurality of first common electrodes alternating with the plurality of first pixel electrodes; a second pixel electrode in the fifth sub-pixel region on the first substrate; and a second common electrode in the fifth sub-pixel region on the second substrate, the second common electrode facing the second pixel electrode.

25 Claims, 6 Drawing Sheets

LIQUID CRYSTAL DISPLAY DEVICE AND METHOD OF DRIVING THE SAME

This application claims the benefit of Korean Patent Application No. 10-2005-0132797, filed on Dec. 29, 2005, which is hereby incorporated by reference in its entirety.

BACKGROUND OF THE INVENTION

1. Field of the Invention

Embodiments of the present invention relates to a liquid crystal display (LCD) device, and more particularly, to an LCD device having an adjustable viewing angle and a method of driving the LCD device. Embodiments of the present invention are suitable for a wide scope of applications. In particular, an embodiment of the present invention is suitable for providing an adjustable viewing angle for a sub-pixel region of an LCD.

2. Discussion of the Related Art

In general, a liquid crystal display (LCD) device relies on an optical anisotropy and a polarizability of liquid crystal molecules to produce an image. The optical anisotropy of liquid crystal molecules causes a refraction of light incident onto the liquid crystal molecules in accordance with an alignment direction of the liquid crystal molecules. Liquid crystal molecules are aligned in specific directions due to their long, thin shape. The alignment direction of the liquid crystal molecules can be controlled by applying an electric field thereto. Among LCD devices, active matrix liquid crystal display (AMLCD) devices have thin film transistors (TFTs) and pixel electrodes connected to the TFTs in a matrix arrangement. AMLCD devices have been widely used because of their high resolution and superiority in displaying moving images.

A twisted nematic (TN) mode LCD device includes a first substrate having a pixel electrode, a second substrate having a color filter layer and a common electrode, and a liquid crystal layer interposed between the first and second substrates. Liquid crystal molecules in the liquid crystal layer are driven by a vertical electric field generated between the pixel electrode and the common electrode. Accordingly, the TN mode LCD device has high transmittance and wide aperture ratio. However, the TN mode LCD device has a relatively narrow viewing angle. An in-plane switching (IPS) mode LCD device has been suggested to overcome the problem of the narrow viewing angle suffered by the TN mode LCD device.

FIG. 1 is a cross-sectional view of an IPS mode LCD device according to the related art. As shown in FIG. 1, an IPS mode LCD device includes a first substrate 110, a second substrate 120 and a liquid crystal layer 130 between the first and second substrates 110 and 120. A pixel electrode 112 and a common electrode 114 are formed on the first substrates 110. A voltage difference is applied between the pixel electrode 112 and the common electrode 114 to align the liquid crystal molecules in the liquid crystal layer 130. The aligned liquid crystal molecules are arranged along a horizontal electric field 100 generated between the pixel electrode 112 and the common electrode 114. The viewing angle increases because the variation in refractive index with respect to the viewing angle is relatively small.

FIG. 2 is a schematic plane view of an array substrate for an IPS mode LCD device according to the related art. Referring to FIG. 2, a gate line GL and a data line DL are formed on a substrate. The gate line GL crosses the data line DL to define a sub-pixel region "SP." A common line "Vcom" is formed to be parallel to and spaced apart from the gate line "GL." A switching element, such as a thin film transistor (TFT) "T," is connected to the gate line GL and the data line "DL." A plurality of common electrodes 252 and a plurality of pixel electrodes 212 are formed in the sub-pixel region "SP." The plurality of common electrodes 252 extend from the common line "Vcom" and are parallel to the data line "DL." The plurality of pixel electrodes 212 extend from an extension line 220 connected to the TFT "T" and alternate with the plurality of common electrodes 252. Gap portions 290 between the pixel electrodes 212 and the common electrode 252 correspond to a substantial aperture region where liquid crystal molecules are driven by a horizontal electric field.

As shown in FIG. 2, the pixel electrode 212 and the common electrode 252 of the related art IPS mode LCD device have a straight bar shape. Such a shape of the pixel electrode 212 and the common electrode 252 produces a mono-domain structure causing shortcomings of the IPS mode LCD device, such as a gray level inversion. An IPS mode LCD device having zigzag-shaped electrodes has been suggested to surmount the shortcomings.

FIG. 3 is a schematic plane view of an array substrate having a zigzag shaped electrode for an IPS mode LCD device according to the related art. Referring to FIG. 3, a pixel electrode 212 and a common electrode 252 have a zigzag shape having at least one bent portion. Not shown in FIG. 3, the data line DL may have a zigzag shape corresponding to the pixel electrode 212 and the common electrode 252. When a voltage is applied to the pixel electrode 212 and the common electrode 252, liquid crystal molecules are re-aligned along at least two directions due to the zigzag shape of the pixel electrode 212 and the common electrode 252. Accordingly, the IPS mode LCD device may have a multi-domain structure. In the multi-domain structure, a color shift phenomenon is reduced and gray level inversion is improved. As a result, the IPS mode LCD device has a relatively wide viewing angle allowing many users to concurrently view the displayed images.

However, some applications require a narrow viewing angle for the displayed images to be viewable by a limited number of users, for example, a single user. For example, an LCD device may be used as a display in an internet banking environment and in an automatic teller machine. In such circumstances, it is desirable that the displayed images could only viewed by a customer standing within a restricted viewing angle of the display and not by people standing or passing by to protect the customer for eventual prying eyes. A side viewing angle of the LCD device can be adjusted using a filter. However, using a filter for adjusting the side viewing angle complicates the fabrication process for the LCD device, and increases power consumption and fabrication cost.

SUMMARY OF THE INVENTION

Accordingly, embodiments of the present invention are directed to a liquid crystal display device and a method of driving the same that substantially obviate one or more of the problems due to limitations and disadvantages of the related art.

An object of an embodiment of the present invention is to provide an adjustable viewing angle for a liquid crystal display device without using a filter.

Another object of an embodiment of the present invention is to provide a method of driving a liquid crystal display device having an adjustable viewing angle without using a filter.

Another object of an embodiment of the present invention is to provide a symmetrically adjustable viewing angle for a liquid crystal display device without using a filter.

Another object of an embodiment of the present invention is to provide a method of driving a liquid crystal display device having a symmetrically adjustable viewing angle without using a filter.

Another object of an embodiment of the present invention is to reduce a flicker in a liquid crystal display device.

Another object of an embodiment of the present invention is to provide a method of driving a liquid crystal device to reduce a flicker in the liquid crystal display device.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these and other advantages and in accordance with the purpose of the present invention, as embodied and broadly described, a liquid crystal display device includes first and second substrates facing and spaced apart from each other, each of the first and second substrates having a first sub-pixel region, a second sub-pixel region, a third sub-pixel region, a fourth sub-pixel region and a fifth sub-pixel region for adjusting a viewing angle, the first, second, third and fourth sub-pixel regions surrounding the fifth sub-pixel region; a liquid crystal layer between the first and second substrates; a plurality of first pixel electrodes in each of the first, second, third and fourth sub-pixel regions on the first substrate; a plurality of first common electrodes in each of the first, second, third and fourth sub-pixel regions on the first substrate, the plurality of first common electrodes alternating with the plurality of first pixel electrodes; a second pixel electrode in the fifth sub-pixel region on the first substrate; and a second common electrode in the fifth sub-pixel region on the second substrate, the second common electrode facing the second pixel electrode.

In another aspect, a liquid crystal display device includes first and second substrates facing each other; a liquid crystal layer between the first and second substrates; a plurality of first pixel electrodes in corresponding first sub-pixel regions of an inner surface of the first substrate; a plurality of first common electrodes on the inner surface of the first substrate, the plurality of first common electrodes alternating with the plurality of first pixel electrodes for generating a substantially horizontal electric field between the plurality of first pixel electrodes and the plurality of first common electrodes in the corresponding first sub-pixel regions; a second pixel electrode in a second sub-pixel region of inner surface of the first substrate; and a second common electrode on an inner surface of the second substrate, the second common electrode facing the second pixel electrode for generating a substantially vertical electric field between the second pixel electrode and the second common electrode in the second sub-pixel region, wherein the second sub-pixel region is centrally located with respect to the plurality of first sub-pixel regions.

In another aspect, a method is provided for driving a liquid crystal display device including first and second substrates facing each other, a liquid crystal layer between the first and second substrates, a plurality of first pixel electrodes in corresponding first sub-pixel regions of an inner surface of the first substrate, a plurality of first common electrodes on the inner surface of the first substrate, the plurality of first common electrodes alternating with the plurality of first pixel electrodes, a second pixel electrode in a second sub-pixel region of inner surface of the first substrate, and a second common electrode on an inner surface of the second substrate, the second common electrode facing the second pixel electrode, wherein the second sub-pixel region is centrally located with respect to the plurality of first sub-pixel regions; the method includes applying a first common voltage to the plurality of first common electrodes to generate a substantially horizontal electric field between the plurality of first pixel electrodes and the plurality of first common electrodes in the corresponding first sub-pixel regions; and applying a second common voltage to the second common electrode to generate a substantially vertical electric field between the second pixel electrode and the second common electrode in the second sub-pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of embodiments of the present invention and are incorporated in and constitute a part of this application, illustrate embodiments of the present invention and together with the description serve to explain the principle of embodiments of the present invention. In the drawings.

DETAILED DESCRIPTION OF EXEMPLARY EMBODIMENTS

Reference will now be made in detail to exemplary embodiments of the present invention, which are illustrated in the accompanying drawings. Wherever possible, the same reference numbers will be used throughout the drawings to refer to the same or similar parts.

Figure 1:
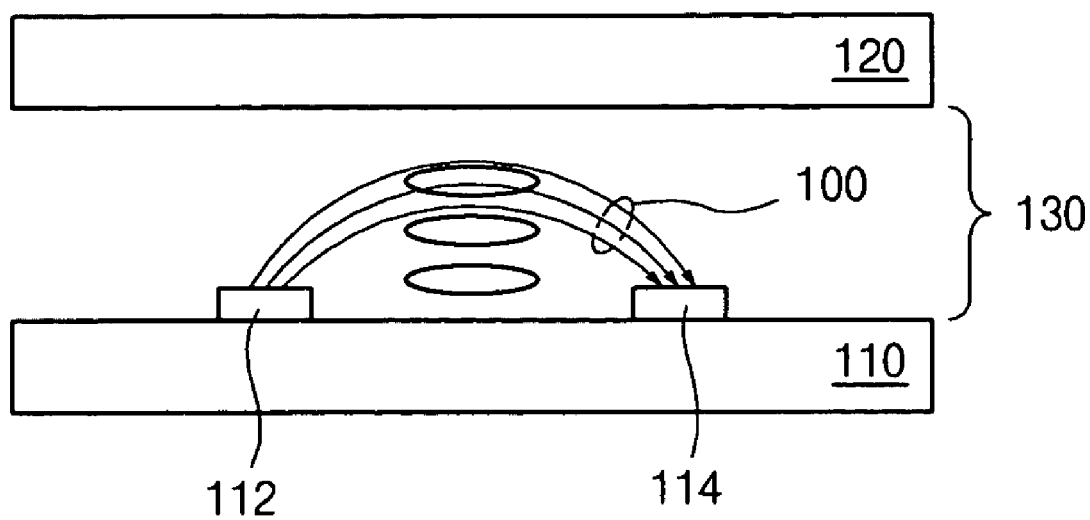
FIG. 1 is a cross-sectional view of an IPS mode LCD device according to the related art.
Figure 2:
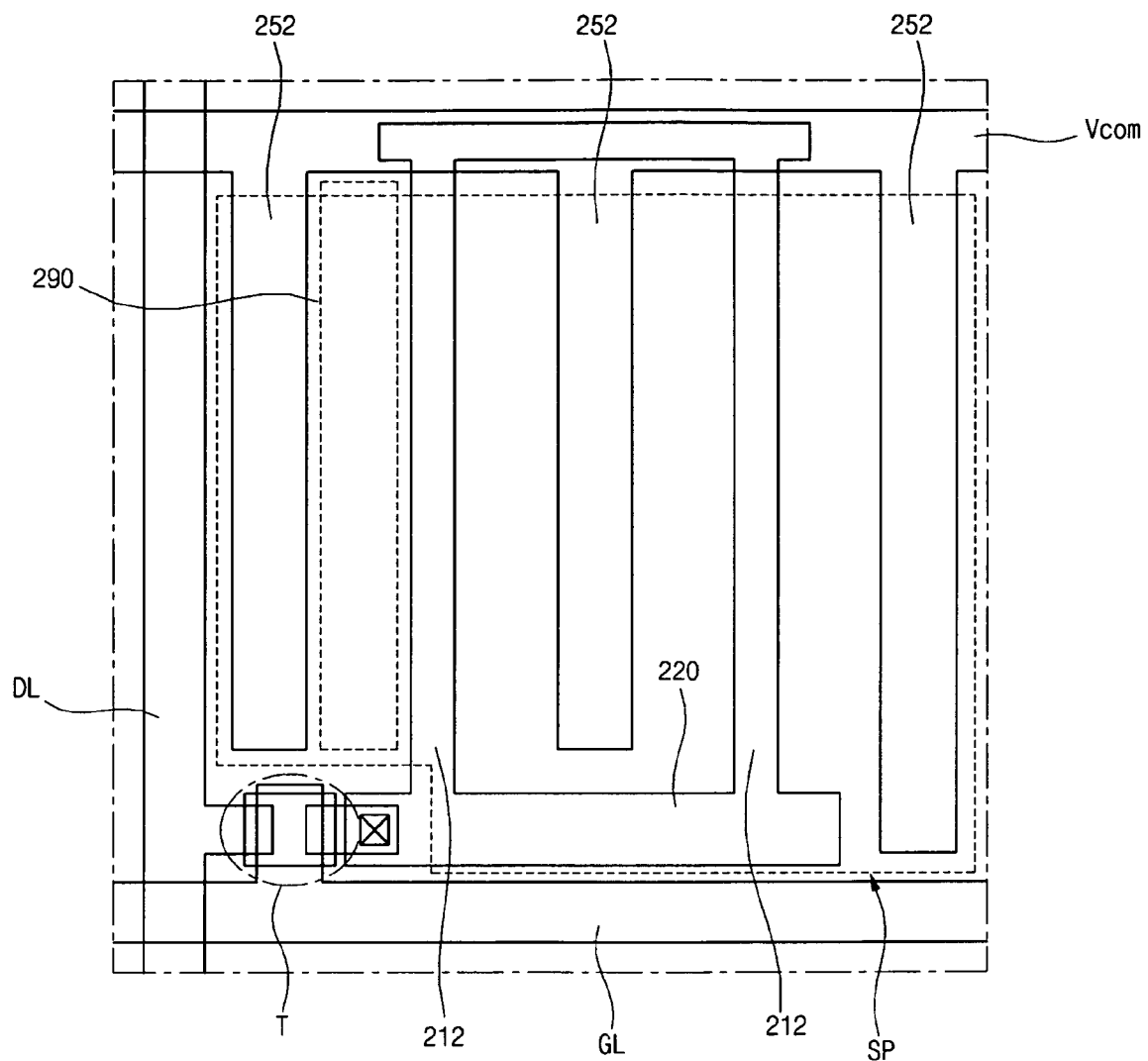
FIG. 2 is a schematic plane view of an array substrate for an IPS mode LCD device according to the related art.
Figure 3:
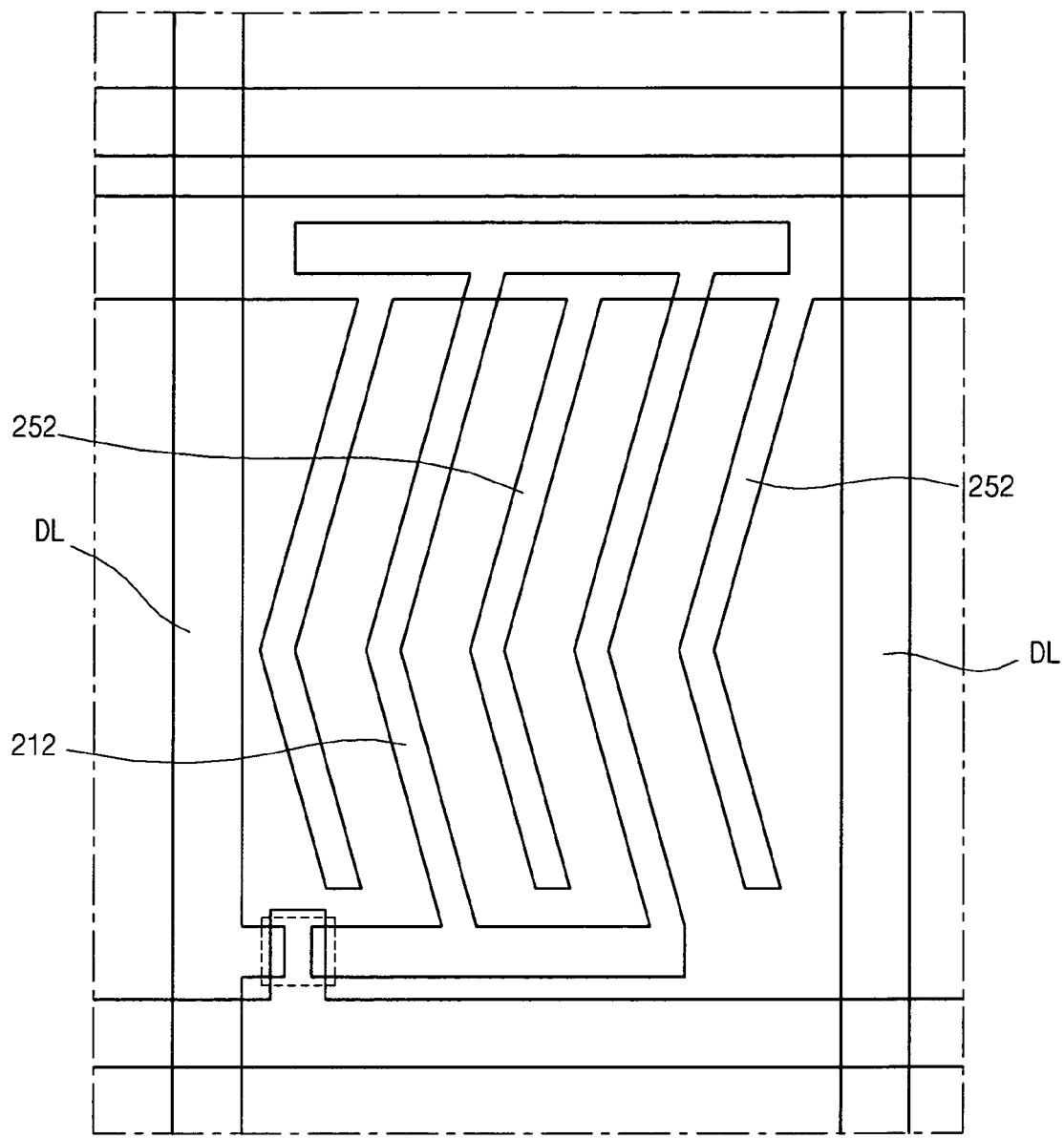
FIG. 3 is a schematic plane view of an array substrate having a zigzag shaped electrode for an IPS mode LCD device according to the related art.
Figure 4A:
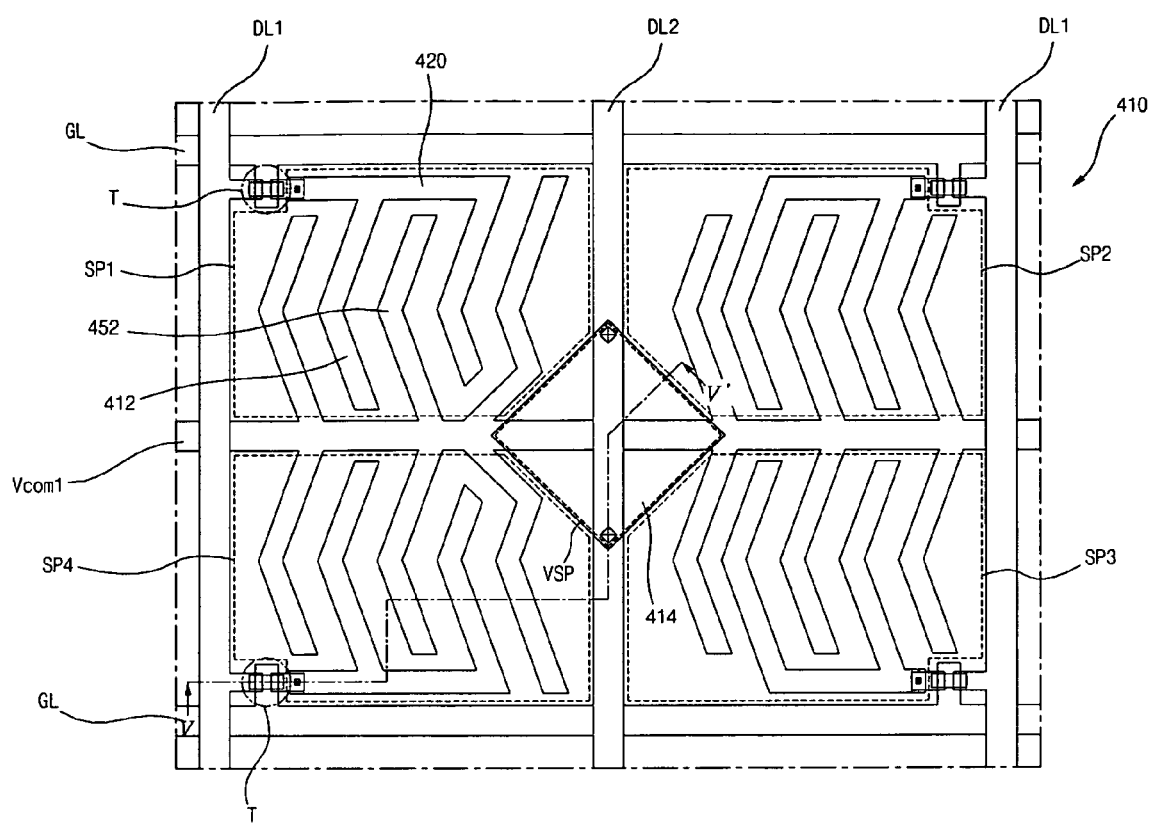
FIG. 4A shows a schematic plane view of exemplary sub-pixel regions in a first substrate of an LCD device according to an embodiment of the present invention.
Figure 4B:
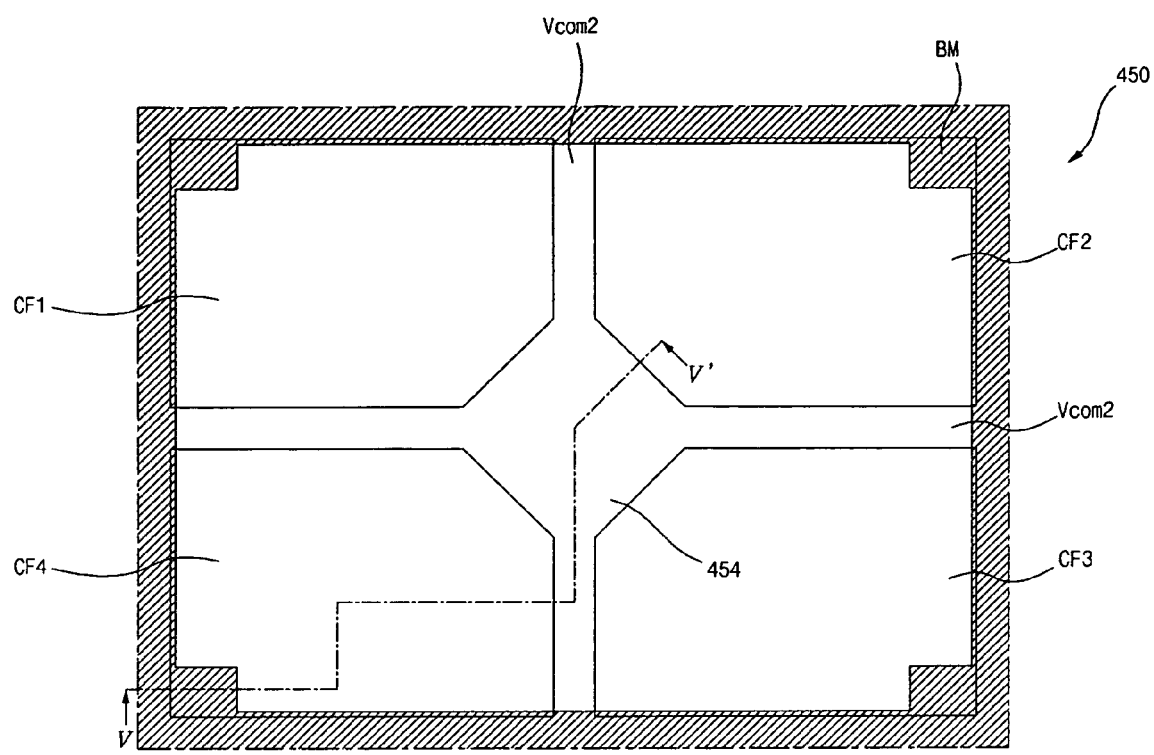
FIG. 4B shows a schematic plane view of exemplary sub-pixel regions in a second substrate of an LCD device according to an embodiment of the present invention.
Figure 5:
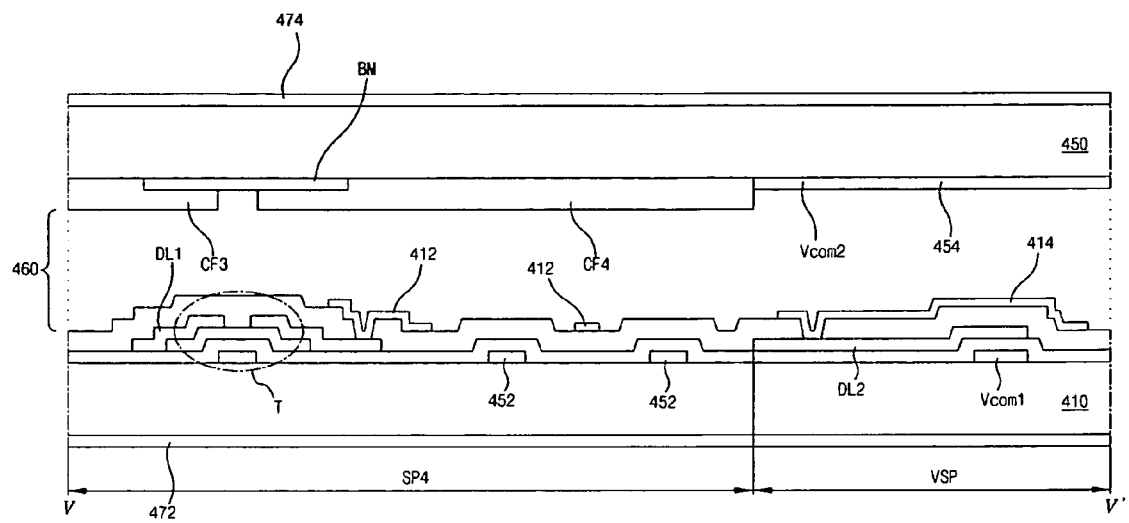
FIG. 5A is a schematic cross-sectional view along line V-V' of FIGS. 4A and 4B of an exemplary sub-pixel region of an LCD device according to an embodiment of the present invention.

FIG. 4A shows a schematic plane view of exemplary sub-pixel regions in a first substrate of an LCD device according to an embodiment of the present invention. FIG. 4B shows a schematic plane view of exemplary sub-pixel regions in a second substrate of an LCD device according to an embodiment of the present invention. FIG. 5A is a schematic cross-sectional view along line V-V' of FIGS. 4A and 4B of an exemplary sub-pixel region of an LCD device according to an embodiment of the present invention. Referring to FIGS. 4A, 4B and 5, an LCD device includes a first substrate 410 and a second substrate 450 facing and spaced apart from each other.

A liquid crystal layer 460 is formed between the first and second substrates 410 and 450. A plurality of gate lines GL, a plurality of first common lines Vcom1, a plurality of first data lines DL1 and a plurality of second data lines DL2 are formed on an inner surface of the first substrate 410. Each of the plurality of gate lines GL is parallel to and spaced apart from the plurality of first common lines Vcom1. Each of the plurality of first data lines DL1 is parallel to and spaced apart from the plurality of second data lines DL2. For example, the plurality of gate lines GL may alternate with the plurality of first common lines Vcom1. Similarly, the plurality of first data lines DL1 may alternate with the plurality of second data lines DL2.

The plurality of gate lines GL cross the plurality of data lines DL to define a plurality of sub-pixel regions in a matrix arrangement. The sub-pixel regions are grouped into pixel regions for displaying images. A pixel region of the LCD device may include five or more adjacent sub-pixel regions. For example, a pixel region may include a first color sub-pixel region SP1, a second color sub-pixel region SP2, a third color sub-pixel region SP3, a fourth color sub-pixel region SP4, and a viewing angle adjusting sub-pixel region VSP.

The first, second, third and fourth color sub-pixel regions SP1, SP2, SP3 and SP4 are disposed in two-by-two matrix and the viewing angle adjusting sub-pixel region VSP is disposed at a central portion of the two-by-two matrix. For example, the viewing angle adjustment sub-pixel region VSP is disposed at or near a crossing of one of the plurality of first common line Vcom1 and the one of the plurality of second data line DL2. Accordingly, the first, second, third and fourth color sub-pixel regions SP1, SP2, SP3 and SP4 surround the viewing angle adjusting sub-pixel region VSP, and the sub-pixel region VSP is centrally adjacent to each of the first, second, third and fourth color sub-pixel regions SP1, SP2, SP3 and SP4. Since the viewing angle adjusting sub-pixel region VSP is disposed at a center portion of the first, second, third and fourth color sub-pixel regions SP1, SP2, SP3 and SP4, the sub-pixel region VSP can symmetrically restrict the viewing angle in the first, second, third and fourth color sub-pixel regions SP1, SP2, SP3 and SP4.

A switching device, such as a thin film transistor (TFT) "T," is formed in each of the color sub-pixel region. The TFT "T" is connected to one of the gate lines GL and one of the first data lines DL1. A plurality of first pixel electrodes 412 is formed in each of the first, second, third and fourth color sub-pixel regions SP1, SP2, SP3 and SP4. Each of the plurality of first pixel electrodes 412 is connected to the TFT "T" in the corresponding color sub-pixel region. Moreover, a plurality of first common electrodes 452 is formed in each of the first, second, third and fourth color sub-pixel regions SP1, SP2, SP3 and SP4. Each of the plurality of first common electrodes 452 is connected to a corresponding one of the first common lines Vcom1. In addition, the first common electrodes 452 alternate with first pixel electrodes 412.

In an embodiment of the present invention, the first pixel electrodes 412 and the first common electrodes 452 may have a zigzag shape having at least one bent portion to form a multi-domain structure. In another embodiment of the present invention, the first pixel electrodes 412 and the first common electrodes 452 can have a straight bar shape. In yet another embodiment of the present invention, the data lines DL1 and DL2 can also have a zigzag shape corresponding to the first pixel electrode 412 and the first common electrode 452.

In an embodiment of the present invention, the plurality of first common lines Vcom1 can be formed in a different layer from the plurality of first pixel electrodes 412. The plurality of first common lines Vcom1 can also be formed of a different material from the plurality of first pixel electrodes 412. In another embodiment of the present invention, the plurality of first common lines Vcom1 can be formed in a same layer as the plurality of first pixel electrodes 412. In yet another embodiment, the plurality of first common lines Vcom1 can also be formed of a same material as the plurality of first pixel electrodes 412.

A second pixel electrode 414 is formed in the viewing angle adjusting sub-pixel region VSP. The second pixel electrode 414 can have plate shape. The second pixel electrode 414 is connected to the second data line DL2. The viewing angle adjusting sub-pixel region VSP is substantially defined by the second pixel electrode 414. Each of the first, second, third and fourth color sub-pixel regions SP1, SP2, SP3 and SP4 are substantially formed by an area defined by the crossing of the gate line GL, the first common line Vcom1, the first data line DL1 and the second data line DL2, and excluding the viewing angle adjusting sub-pixel region VSP. Accordingly, each of the first, second, third and fourth color sub-pixel regions SP1, SP2, SP3 and SP4 may have a substantially pentagonal shape and the viewing angle adjusting sub-pixel region "VSP" may have a substantially lozenge or diamond shape.

A black matrix BM corresponding to the gate line GL, the first data line DL1 and the TFT "T" are formed on an inner surface of the second substrate 450. A color filter layer including first, second, third and fourth color filters CF1, CF2, CF3 and CF4 is formed on the black matrix BM and the inner surface of the second substrate 450 in open portions of the black matrix BM. The first, second, third and fourth color filters CF1, CF2, CF3 and CF4 are formed in the first, second, third and fourth color sub-pixel regions SP1, SP2, SP3 and SP4, respectively. For example, the first, second, third and fourth color filters CF1, CF2, CF3 and CF4 may correspond to red, green, blue and white filters. Since the pixel region includes the fourth sub-pixel region SP4 displaying a white image, brightness of the LCD device is improved.

A plurality of second common lines Vcom2 are formed on the inner surface of the second substrate 450. In an embodiment of the present invention, the plurality of second common lines Vcom2 may be formed in two crossing directions to have a mesh shape as shown in FIG. 4B. In another embodiment of the present invention, the plurality of second common lines Vcom2 may be formed along a single direction. For example, the plurality of second common lines Vcom2 may be formed along the gate line GL for reducing a parasitic capacitance between the second common line Vcom2 and the second data line DL2. A second common electrode 454 having a plate shape is formed in the viewing angle adjusting sub-pixel region VSP on the inner surface of the second substrate 450. The second common electrode 454 is connected to the plurality of second common lines Vcom2.

As shown in FIG. 5, the LCD device may further include first and second polarizing plates 472 and 474 formed on outer surfaces of the first and second substrates 410 and 450, respectively. Transmission axes of the first and second polarizing plates 472 and 474 may cross each other. For example, the transmission axes of the first and second polarizing plates 472 and 474 may be about 0° and about 90°, respectively, with respect to a direction parallel to the gate line GL. Further, the liquid crystal layer may be aligned such that initial alignment directions at bottom and top portions of the liquid crystal layer 400 are opposite to each other. For example, the initial alignment directions at the top and bottom portions of the liquid crystal layer 400 may be about 90° and about 270°, respectively, with respect to a direction parallel to the gate line GL.

An exemplary operation of the liquid crystal layer 460 in each sub-pixel region can be described as follows. In each of the first, second, third and fourth color sub-pixel regions SP1, SP2, SP3 and SP4, the TFT "T" is turned on by a gate signal through the gate line GL. Then, a first data signal is transmitted from the first data line DL1 to the plurality of first pixel electrodes 412 through the TFT "T." A first common voltage is applied to the plurality of first common electrodes 452 through the first common line Vcom1. Accordingly, the liquid crystal layer 460 in the first, second, third and fourth color sub-pixel regions SP1, SP2, SP3 and SP4 is re-aligned by a horizontal electric field generated between the first pixel electrode 412 and the first common electrode 452 while the TFT "T" is turned on, thereby displaying images having a relatively wide viewing angle.

In the viewing angle adjusting sub-pixel region VSP, a second data signal is applied to the second pixel electrode 414 during an ON state and not applied to the second pixel electrode 414 during an OFF state of the sub-pixel region VSP. A second common voltage is applied to the second common electrode 454 through the second common line Vcom2. During the ON state of the sub-pixel region VSP, the liquid crystal layer in the viewing angle adjusting sub-pixel region VSP is re-aligned by a vertical electric field generated between the second pixel electrode 414 and the second common electrode 454. Accordingly, the transmittance of the liquid crystal layer 460 in the viewing angle adjusting sub-pixel region VSP approaches about 0% along a normal direction of the LCD device and increases with the viewing angle to be parallel to an oblique direction with respect to the normal direction. During the OFF state of the sub-pixel region VSP, the transmittance of the liquid crystal layer 460 approaches about 0% along all directions. Accordingly, the liquid crystal layer 460 in the viewing angle adjusting sub-pixel region VSP restrict the viewing angle of the LCD device during the ON state of the sub-pixel region VSP, and does not restrict the viewing angle of the LCD device during the OFF state of the sub-pixel region VSP. Accordingly, the viewing angle of the LCD device is adjusted by the viewing angle adjusting sub-pixel region VSP. The first and second data signals can be different from each other, and the first and second common voltages can also be different from each other.

Figure 6:
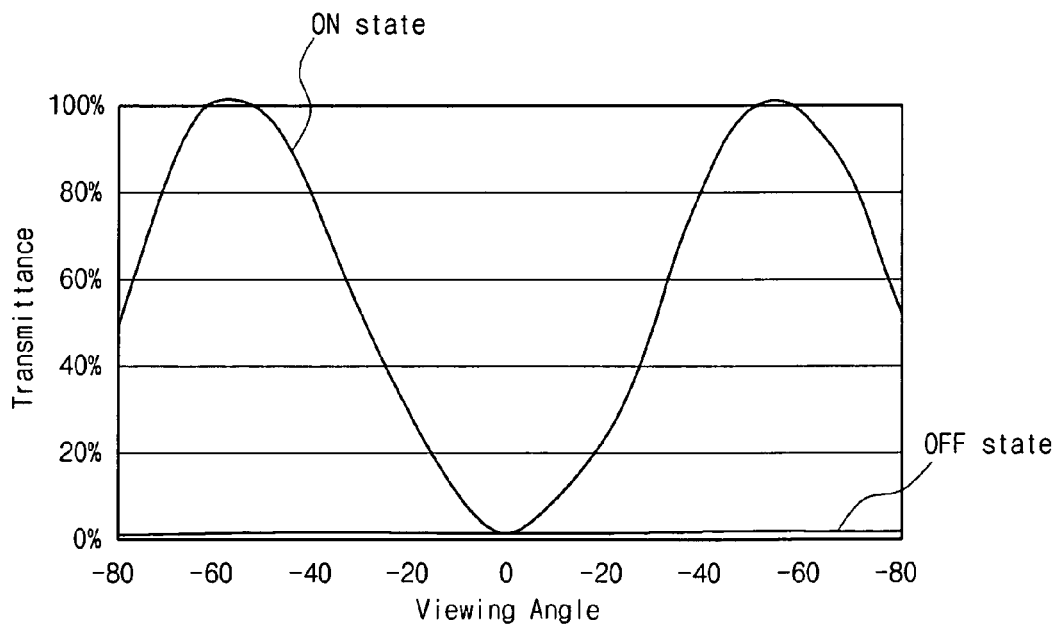
FIG. 6 is a graph illustrating an operation of an exemplary sub-pixel region for adjusting a viewing angle of an LCD device according to an embodiment of the present invention.

FIG. 6 is a graph illustrating an operation of an exemplary sub-pixel region for adjusting a viewing angle of an LCD device according to an embodiment of the present invention. As shown in FIG. 6, when the viewing angle adjusting sub-pixel region VSP is in the OFF state, the transmittance of the liquid crystal layer 460 in the sub-pixel region VSP is very low, for example close to or about 0% along all viewing angles. When the viewing angle adjusting sub-pixel region VSP is in the ON state, the transmittance of the liquid crystal layer 460 in the sub-pixel region VSP is close to or about 0% along a front direction of the LCD device and increases with the viewing angle increases obliquely with respect to the front direction. The front direction can be, for example, a normal direction to the first and second substrates 410 and 450.

Accordingly, when the viewing angle adjusting sub-pixel region VSP is in the OFF state, it does not contribute to displaying images and the LCD device displays images visible to several users using the first to fourth color sub-pixel regions SP1, SP2, SP3 and SP4. In addition, when the sub-pixel region VSP is in the ON state, it displays a white image in the oblique direction with respect to the front direction. Since the white image prevent the first to fourth color sub-pixel regions SP1, SP2, SP3 and SP4 from displaying images along the oblique direction, the viewing angle of the LCD device along the oblique direction is restricted and the LCD device displays images for a user positioned in front of the LCD device.

In another embodiment of the present invention, the LCD device may include an additional thin film transistor (TFT) in the viewing angle adjusting sub-pixel region VSP. The additional TFT may switch the second data signal and may be connected to an additional gate line supplying an additional gate signal.

When an area of the viewing angle adjusting sub-pixel region VSP is small compared with a total area of the pixel region, including sub-pixel regions SP1, SP2, SP3 and SP4, the white image along the oblique direction is too weak to restrict the viewing angle of the LCD device. In addition, when the area of the viewing angle adjusting sub-pixel region VSP is large compared with a total area of the pixel region, the white image along the oblique direction becomes so strong that color reproducibility of the LCD device is reduced. Accordingly, a ratio of the area of the viewing angle adjusting sub-pixel region VSP to the total area of the pixel region, including the sub-pixel regions SP1, SP2, SP3, SP4 and VSP, is within a range of about 10% to about 50% to obtain optimum color reproducibility and sufficient capability of adjusting a viewing angle.

In the LCD device, a first pixel voltage of the first pixel electrode 412 may be reduced due to a parasitic capacitance between a gate electrode and a drain electrode of the corresponding TFT "T" and a capacitance between the first pixel electrode 412 and the first common electrode 452 when the TFT "T" is turned off. The variation in the first pixel voltage is referred to as a kickback voltage and may cause deterioration such as flicker. The flicker is improved by adjusting a common voltage applied to the first common electrode 452.

In the LCD device, each of the first to fourth color sub-pixel regions SP1, SP2, SP3 and SP4 may have a different electrode structure from the sub-pixel region VSP. Accordingly, the first pixel voltage variation $\Delta Vp1$ in each of the first to third color sub-pixel regions SP1, SP2 and SP3 can be different from a second pixel voltage variation $\Delta Vp2$ in the sub-pixel region VSP. In an embodiment of the present invention, different common voltages can be applied to each of the first to fourth color sub-pixel regions SP1, SP2, SP3 and SP4 and to the viewing angle adjusting sub-pixel region VSP to reduce the flicker in each of the sub-pixel regions SP1, SP2, SP3, SP4 and VSP.

In accordance with an embodiment of the present invention, the viewing angle is adjusted using an additional sub-pixel region that displays a white image along an oblique direction with respect to a front direction of the LCD device. Moreover, the brightness of the LCD device is improved due to the additional fourth color sub-pixel region. In addition, the flickers due to the pixel voltage variation in the color sub-pixel region driven by an horizontal electric field and in the viewing angle adjusting region driven by a vertical electric field are individually reduced by applying different common voltages to the color sub-pixel region and the viewing angle adjusting region, respectively. Accordingly, the LCD device displays images of high display quality with a switchable viewing angle. In addition, since the viewing angle adjusting pixel region VSP is disposed at a center portion of the first, second, third and fourth color sub-pixel regions, the viewing angle is symmetrically restricted in the first, second, third and fourth color sub-pixel regions. In addition, the flickers due to the pixel voltage variation in the color sub-pixel region driven by the horizontal electric field and in the viewing angle adjusting region driven by the vertical electric field are individually improved by applying the different common voltages to the color sub-pixel region and the viewing angle adjusting region, respectively. Accordingly, the LCD device displays images of high display quality with a switchable viewing angle.

It will be apparent to those skilled in the art that various modifications and variations can be made in the liquid crystal display device and method of driving the same of embodiments of the present invention. Thus, it is intended that embodiments of the present invention cover the modifications and variations of the embodiments described herein provided they come within the scope of the appended claims and their equivalents.

What is claimed is:

1. A liquid crystal display device, comprising:
   first and second substrates facing and spaced apart from each other, each of the first and second substrates having a first sub-pixel region, a second sub-pixel region, a third sub-pixel region, a fourth sub-pixel region and a fifth sub-pixel region for adjusting a viewing angle, the first, second, third and fourth sub-pixel regions surrounding the fifth sub-pixel region;
   a liquid crystal layer between the first and second substrates;
   a plurality of first pixel electrodes in each of the first, second, third and fourth sub-pixel regions on the first substrate;
   a plurality of first common electrodes in each of the first, second, third and fourth sub-pixel regions on the first substrate, the plurality of first common electrodes alternating with the plurality of first pixel electrodes;
   a second pixel electrode in the fifth sub-pixel region on the first substrate; and
   a second common electrode in the fifth sub-pixel region on the second substrate, the second common electrode facing the second pixel electrode.

2. The device of claim 1, wherein the first, second, third and fourth sub-pixel regions are disposed in a two-by-two matrix, and the fifth sub-pixel region is disposed at a substantially central portion of the two-by-two matrix.

3. The device of claim 1, wherein the liquid crystal layer in each of the first, second, third and fourth sub-pixel regions is driven by a horizontal electric field between the first pixel electrode and the first common electrode, and the liquid crystal layer in the fifth sub-pixel region is driven by a vertical electric field between the second pixel electrode and the second common electrode.

4. The device of claim 1, wherein a transmittance of the fifth sub-pixel region is about 0% along a normal direction of the second substrate, and the transmittance of the fifth sub-pixel region increases in accordance with a viewing angle with respect to the normal direction.

5. The device of claim 4, wherein the transmittance of the fifth sub-pixel region has a maximum value when the viewing angle is about 60° with respect to the normal direction.

6. The device of claim 1, wherein the first, second, third and fourth sub-pixel regions display red, green, blue and white images, respectively.

7. The device of claim 1, wherein a ratio of an area of the fifth sub-pixel region to a total area of the first, second, third, fourth and fifth sub-pixel region is within a range of about 10% to about 50%.

8. The device of claim 1, further comprising:
   a gate line, a first common line, a first data line and a second data line on the first substrate, the gate line alternating with the first common line and the first data line alternating with the second data line, the gate line and the first common line cross the first and second data lines;
   a second common line on the second substrate; and
   a thin film transistor connected to the gate line and the first data line.

9. The device of claim 8, wherein initial alignment directions of the liquid crystal layer at the first and second substrates are about 90° and about 270°, respectively, with respect to a direction parallel to the gate line.

10. The device of claim 8, further comprising first and second polarizing plates on outer surfaces of the first and second substrates, respectively.

11. The device of claim 10, wherein transmission axes of the first and second polarizing plates are about 0° and about 90°, respectively, with respect to a direction parallel to the gate line.

12. The device of claim 8, wherein each of the plurality of first pixel electrodes and the plurality of first common electrodes has a bar shape, and each of the second pixel electrode and the second common electrode has a plate shape corresponding to a crossing of the first common line and the second data line.

13. The device of claim 12, wherein each of the plurality of first pixel electrodes and the plurality of first common electrodes has a zigzag shape having at least one bent portion.

14. The device of claim 8, wherein the first pixel electrodes are connected to the thin film transistor, and the second pixel electrode is connected to the second data line.

15. The device of claim 8, further comprising first, second, third and fourth color filters in the first, second, third and fourth sub-pixel regions, respectively, on the second substrate.

16. The device of claim 1, wherein a first common voltage is applied to the plurality of first common electrodes, and a second common voltage different from the first common voltage is applied to the second common electrode.

17. A liquid crystal display device, comprising:
   first and second substrates facing each other;
   a liquid crystal layer between the first and second substrates;
   a plurality of first pixel electrodes in corresponding first sub-pixel regions of an inner surface of the first substrate;
   a plurality of first common electrodes on the inner surface of the first substrate, the plurality of first common electrodes alternating with the plurality of first pixel electrodes for generating a substantially horizontal electric field between the plurality of first pixel electrodes and the plurality of first common electrodes in the corresponding first sub-pixel regions;
   a second pixel electrode in a second sub-pixel region of inner surface of the first substrate; and
   a second common electrode on an inner surface of the second substrate, the second common electrode facing the second pixel electrode for generating a substantially vertical electric field between the second pixel electrode and the second common electrode in the second sub-pixel region, wherein the second sub-pixel region is centrally located with respect to the plurality of first sub-pixel regions.

18. The liquid crystal device of claim 17, wherein a first common voltage is applied to the plurality of first common electrodes, and a second common voltage different from the first common voltage is applied to the second common electrode.

19. The liquid crystal device of claim 17, wherein a transmittance of the liquid crystal layer in the second sub-pixel region increases in accordance with a viewing angle in an oblique direction.

20. The liquid crystal device of claim 17, wherein a transmittance of the liquid crystal layer in the second sub-pixel region is substantially low in accordance with a wide viewing angle.

21. The liquid crystal device of claim 17, wherein the second sub-pixel region transmits a white light through the liquid crystal layer in an oblique direction.

22. The liquid crystal device of claim 17, wherein each of the plurality of first pixel electrodes has a bar shape.

23. The liquid crystal device of claim 17, wherein each of the plurality of first pixel electrodes has a zigzag shape.

24. The liquid crystal device of claim 12, wherein the second pixel electrode has a plate shape.

25. The liquid crystal device of claim 24, wherein the second pixel electrode has a lozenge shape.

* * * * *